(No Model.) 2 Sheets—Sheet 1.
T. M. FOOTE.
VARIABLE SPEED GEARING FOR ELECTRIC CARS.
No. 433,401. Patented July 29, 1890.
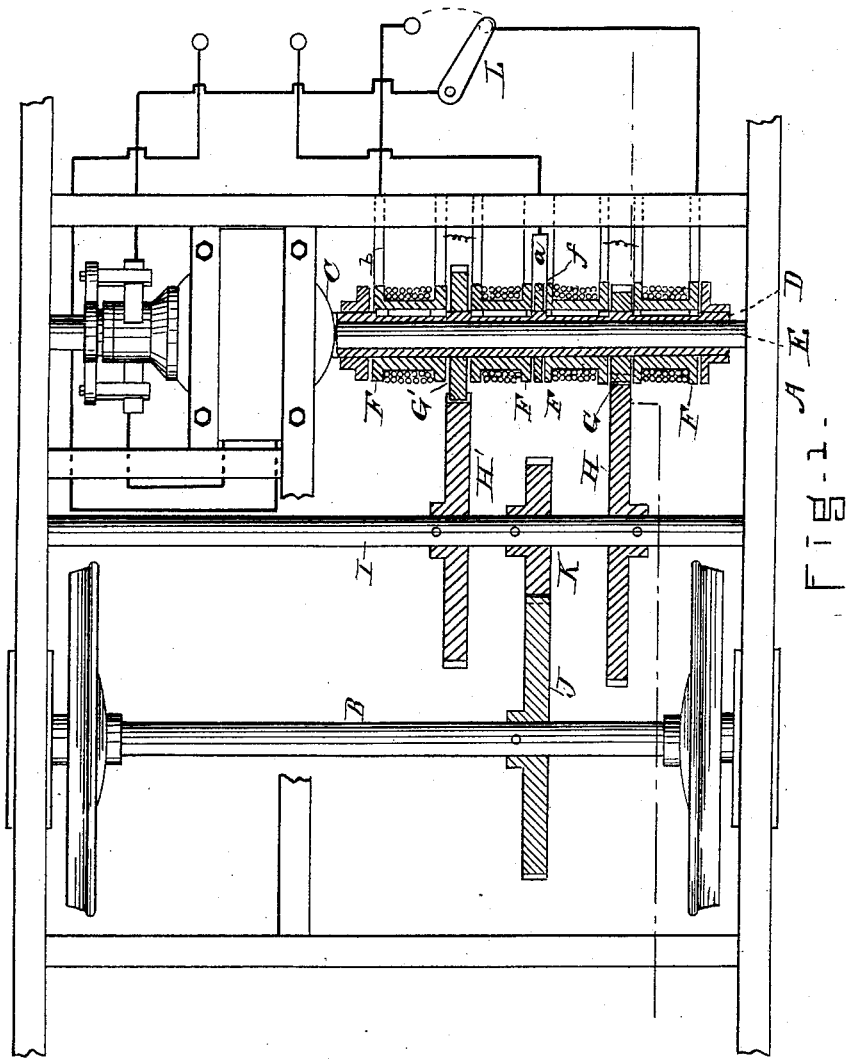
WITNESSES.
Matthew M Blunt,
Charles J. Pillsbury
INVENTOR.
Theodore M. Foote
by his attorney
Aly. L. Hayes (No Model.) 2 Sheets—Sheet 2.
T. M. FOOTE.
VARIABLE SPEED GEARING FOR ELECTRIC CARS.
No. 433,401. Patented July 29, 1890.
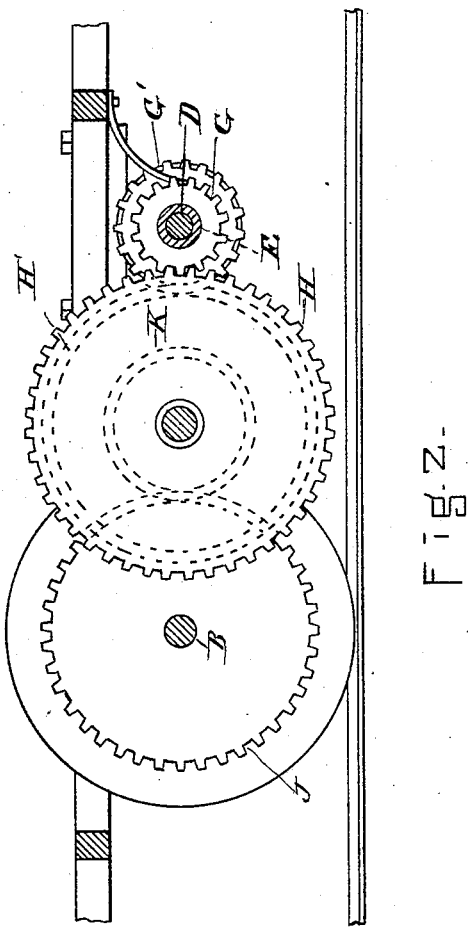
WITNESSES.
Matthew M. Blunt,
Charles J. Pillsbury
INVENTOR.
Theodore M. Foote
by his attorney
Alex. L. Hayes

UNITED STATES PATENT OFFICE.

THEODORE M. FOOTE, OF BOSTON, MASSACHUSETTS.

VARIABLE-SPEED GEARING FOR ELECTRIC CARS.

SPECIFICATION forming part of Letters Patent No. 433,401, dated July 29, 1890.

Application filed November 6, 1889. Serial No. 329,426. (No model.)

*To all whom it may concern:*

Be it known that I, THEODORE M. FOOTE, of Boston, in the county of Suffolk and State of Massachusetts, have invented a new and useful Improvement in Variable-Speed Gearing for Electric Cars, of which the following, taken in connection with the accompanying drawings, is a specification.

In the application of the electric motor to the propulsion of street-cars it has been found desirable, for electrical reasons, to rotate the armature of the motor at a high speed and to connect the motor-shaft to the car-axle by gearing whereby the speed at which this car-axle rotates is reduced below the speed of the motor-shaft to the extent required for the speed which is adopted for the car. When therefore the car moves slowly, the speed of the motor-shaft is correspondingly reduced, with a consequent reduction, in accordance with well-known electrical laws, in the economic efficiency of the motor, or, in other words, in the ratio of the useful work done by it to the work done by the generator and prime mover, and inasmuch as it is desirable in an electric-railroad system to maintain the generator and prime mover at as near a constant speed as possible there is often work done by the generator which is not utilized by the motor, for the reason that its speed is not the best to utilize this energy.

When the car is running at a constant speed upon a level track, so that the load upon the motor is constant, the motor operates at its best efficiency; but when the load is increased by the additional work required to ascend inclines or pass around curves, the motor moves slowly and consequently operates less economically; or, if the speed is to be maintained, an increased current is required, and this current may be of such strength as to develop sufficient heat to burn out the armature. In order to avoid this danger and to provide the necessary reserve power for ascending inclines or passing around curves, the motors now used upon cars are much larger and of much greater power than is required for propelling the cars upon a level and straight track. This is a disadvantage, inasmuch as it not only increases the cost of a car, but also increases the weight of the same and requires a greater current. It would therefore much reduce the cost of operating an electric-railroad system if the motor upon the car could be constantly maintained at what is known as its "critical" speed, or that at which it does its work most efficiently and with the least waste of energy, and if means could be provided for coupling the car at will to the constantly-rotating motor-shaft.

In an application for Letters Patent of the United States filed by me July 18, 1889, Serial No. 317,879, I have described and claimed a method of accomplishing this result, which method consists in establishing at will by magnetic attraction a frictional contact between a rotating disk upon the motor-shaft and a disk geared to the work.

In the invention which forms the subject of the present application for a patent of the United States I have utilized this principle of construction for determining the connection of the motor-shaft at will with different trains of gearing connecting said shaft to the work, whereby with a constant speed imparted to the motor-shaft the car-axle may be made to rotate at a different relative speed to the motor, according to the gearing with which the car-axle is connected.

In the accompanying drawings I have shown a device which embodies the principle of my invention as applied to a car-truck, and in these drawings—

Figure 1 is a view partly in plan and partly in section, and Fig. 2 is a transverse sectional view.

In both the figures the same letters refer to the same parts.

Referring to the drawings, A is the car-truck.

B is the axle of the car-wheels, which axle is connected by suitable gearing to the motor-shaft. I have shown toothed gearing; but any other suitable gearing may be used.

C is the motor, and D is a rotating sleeve forming the motor-shaft.

The form of motor which I have shown as used with this device is that which is described and claimed in an application for Letters Patent of the United States filed by me July 18, 1889, Serial No. 317,880, in which the armature is mounted upon a sleeve D, which rotates upon the fixed shaft E; but any other form of motor may be used. The magnetic coupling consists of two collars of magnetic metal F upon the sleeve E and rotating with it, but capable of a longitudinal movement on this sleeve and placed one on each side of a collar of magnetic metal loose upon the sleeve E. The collars are surrounded with coils of wire forming part of an electric circuit, which coils when traversed by a current effect the magnetization of the collars and cause them to adhere to the loose collar. This loose collar gears with the car-axle, and consequently when the collars F F are magnetized the rotation of the motor is communicated to the car-axle. The construction and operation of this coupling is fully described in the application for a patent before referred to, Serial No. 317,879.

In the invention which is described in the present application I have two sets of magnetic coupling and two loose collars G G', of different diameters, and respectively gearing with toothed wheels H H', of different diameters, upon a counter-shaft I, gearing by means of a pinion K with a toothed wheel upon the car-axle. The number of teeth on the collar G and wheel H bears such a relation to the number of the teeth on the collar G' and wheel H' that with the same speed of rotation of the armature the wheel H' will rotate faster than the wheel H, and consequently with the same speed of rotation of the armature the car-axle will have a different speed of rotation, according as one or the other of the magnetic couplings is excited by the current, so as to establish a connection between the motor and the car-axle. These magnetic couplings are arranged side by side upon the same sleeve and are separated from one another by a collar f, of non-magnetic metal.

The current is conveyed from one of the terminals of the generator to a strip of metal a, which bears upon the face of this collar, and thence passes to the coils on either side, according to the position of a switch or circuit-changer L in the circuit, and strips of metal b, which bear upon the faces of the rotating collars, convey the current from the coils to the conducting-wire. I have shown the motor as included in the circuit; but it may be placed in a branch circuit or in a separate circuit.

I have shown the coupling as composed of two collars—one on each side of a loose collar; but there may be only one fixed collar, and the coil may be upon the loose collar, as set forth in the application before referred to. By magnetizing either of these sets of couplings the motor can be connected with the wheel H or with the wheel H', so as to communicate a faster or slower speed of rotation to the axle of the wheels; but inasmuch as the motor is always maintained at the same speed the effect of reducing the speed of the car-axle is to cause more power to be applied to this axle, and therefore to enable an increased load to be overcome.

When the car is required to ascend inclines or pass around curves, the increased load upon the motor is overcome by shifting from one gearing to the other without reducing the speed of the motor, so that with a reduction on the speed of the car-axle the motor acts upon the same with an increased leverage, thus obviating the necessity of increasing the current through the motor.

The wheels H H', instead of being upon the same shaft, may be upon different shafts, in which case they may be of the same size.

The principle of my invention consists in providing two or more sets of gearing, which with the same speed of rotation of the armature-shaft communicate a different speed of rotation to the car-axle, and this principle may be carried into effect by any suitable form or arrangement of gearing. I may have more than two sets of coupling with corresponding gearing, and I do not limit myself to two sets. By means of this magnetic coupling the motor is quickly and easily connected without shock to any one of the sets of gearing, as may be required.

Having thus described my invention, what I claim, and desire to secure by Letters Patent of the United States, is—

1. The combination of a dynamo-electric motor, mechanism driven thereby, two collars fixed to rotate on the motor-shaft, two collars loose on said shaft, each of said loose collars being geared with said mechanism, magnetizing-coils on two of said collars, electric circuits connected with said coils, and a circuit-changer for shifting the current from one circuit to the other.

2. The combination, substantially as and for the purpose set forth, with the rotating shaft of an electric motor, of two or more collars of magnetic metal loose upon this shaft, and each geared to the work to operate the same with different power, two or more sets of collars capable of being magnetized upon the motor-shaft and rotating with it, and having a longitudinal movement on the same, and each acting when magnetized to establish a frictional contact with one of the loose collars, coils for magnetizing these fixed collars, a source of electrical energy, electric circuits from this source of energy, each passing, respectively, through coils upon the fixed collars, and a device for establishing at will an electrical connection between the source of electrical energy and the coils of either of the fixed collars.

3. The combination, substantially as and for the purpose set forth, of the motor C, the rotating sleeve D, the collars of magnetic metal G G', loose upon the sleeve, each geared to the work to operate the same with different power, the collars F, of magnetic metal, rotating with the sleeve, but capable of longitudinal movement on the same, magnetizing-coils on these collars, the collar K, the spring a, bearing on the same, the springs b, bearing upon the fixed collars, a source of electric energy, electric circuits passing from the generator and through the coils upon each set of fixed collars, and means for establishing at will an electric circuit through the coils of either set of collars.

4. The combination, substantially as and for the purpose set forth, of the motor B, the rotating sleeve E, the counter-shaft I, gearing with the car-axle, the loose collar G upon the rotating sleeve gearing with the wheel H on the counter-shaft, the loose collar G' upon the rotating sleeve gearing with the wheel H', to communicate a slower speed to the counter-shaft than the gearing G H, the collars F, one on each side of a loose collar and capable of longitudinal movement on the sleeve, magnetizing-coils upon the fixed collars, and means for magnetizing at will either pair of fixed collars, whereby by magnetic attraction a frictional contact is established between each of the loose collars and the fixed collars.

In testimony whereof I have signed my name to this specification, in the presence of two subscribing witnesses, on this 4th day of November, A. D. 1889.

THEODORE M. FOOTE.

Witnesses:
ALEX. L. HAYES,
CHARLES J. PILLSBURY.